(12) United States Patent
Lee et al.

(10) Patent No.: US 9,641,013 B2
(45) Date of Patent: May 2, 2017

(54) METHOD OF BALANCING RACK VOLTAGES OF BATTERY PACK INCLUDING RACKS

(71) Applicant: LG CHEM, LTD., Seoul (KR)

(72) Inventors: Jongkook Lee, Daejeon (KR); Hyunchul Lee, Daejeon (KR); Jongmin Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/910,311

(22) PCT Filed: Aug. 12, 2014

(86) PCT No.: PCT/KR2014/007476
§ 371 (c)(1),
(2) Date: Feb. 5, 2016

(87) PCT Pub. No.: WO2015/030392
PCT Pub. Date: Mar. 5, 2015

(65) Prior Publication Data
US 2016/0172875 A1 Jun. 16, 2016

(30) Foreign Application Priority Data
Aug. 28, 2013 (KR) .................. 10-2013-0102565

(51) Int. Cl.
*H02J 7/00* (2006.01)
(52) U.S. Cl.
CPC ............ *H02J 7/007* (2013.01); *H02J 7/0014* (2013.01); *Y02T 10/7055* (2013.01)
(58) Field of Classification Search
CPC ....................................................... H02J 7/007
(Continued)

(56) References Cited

U.S. PATENT DOCUMENTS 8,054,045 B2 * 11/2011 Kawahara .......... G01R 31/3624
320/127
9,000,732 B2 * 4/2015 Kim ................... G01R 31/3679
320/162
(Continued)

FOREIGN PATENT DOCUMENTS

JP  2001-218376 A  8/2001
JP  2012-138979 A  8/2001
(Continued)

OTHER PUBLICATIONS

International Search Report, issued in PCT/KR2014/007476, mailed Nov. 10, 2014.

*Primary Examiner* — Drew A Dunn
*Assistant Examiner* — Jerry D Robbins
(74) *Attorney, Agent, or Firm* — Birch, Stewart, Kolasch & Birch, LLP

(57) ABSTRACT

A method of balancing rack voltages of a battery pack having a plurality of racks includes (a) a voltage measurement step of measuring voltages of the racks, (b) a sorting step of sorting the racks in ascending powers based on the voltage values of the racks, (c) a comparison step of comparing a difference between a maximum voltage value and a minimum voltage value with a set voltage, (d) a charging/discharging count step of comparing the voltage values of the racks with a reference voltage to increase a charging or discharging count, and (e) a charging/discharging step of charging or discharging the racks according to the charging or discharging count. In a case in which, at step (c), the difference between the maximum voltage value and the minimum voltage value is lower than the set voltage, the racks are charged with the maximum voltage value without steps (d) and (c).

20 Claims, 3 Drawing Sheets

(58) Field of Classification Search
USPC .......................................................... 320/118
See application file for complete search history.

(56) References Cited

U.S. PATENT DOCUMENTS

| | | | |
|---|---|---|---|
| 9,325,178 B2* | 4/2016 | Yun | H02J 7/0019 |
| 9,368,979 B2* | 6/2016 | Gong | H02J 7/0016 |
| 2006/0097698 A1 | 5/2006 | Plett | |
| 2006/0119319 A1* | 6/2006 | Sakurai | H02J 7/0016 |
| | | | 320/116 |
| 2009/0079391 A1* | 3/2009 | Lupu | H02J 7/0016 |
| | | | 320/122 |
| 2010/0019724 A1* | 1/2010 | Mizutani | H01M 10/425 |
| | | | 320/118 |
| 2011/0074354 A1* | 3/2011 | Yano | H01M 10/441 |
| | | | 320/116 |
| 2011/0156649 A1 | 6/2011 | Wu | |
| 2011/0241622 A1 | 10/2011 | Li et al. | |
| 2013/0049698 A1 | 2/2013 | Jung | |
| 2013/0106360 A1* | 5/2013 | Gaylo | H02J 7/0013 |
| | | | 320/134 |
| 2013/0134943 A1 | 5/2013 | Maloizel et al. | |

FOREIGN PATENT DOCUMENTS

| | | |
|---|---|---|
| JP | 2012-228047 A | 11/2012 |
| KR | 10-2013-0024763 A | 3/2013 |

\* cited by examiner

METHOD OF BALANCING RACK VOLTAGES OF BATTERY PACK INCLUDING RACKS

TECHNICAL FIELD

The present invention relates to a method of balancing rack voltages of a battery pack including racks, and more particularly to a method of balancing rack voltages of a battery pack configured to have a structure in which a plurality of racks is connected in series or in parallel to each other, and a plurality of unit modules is connected in series to each other in each of the racks, the rack voltage balancing method including a voltage measurement step of measuring voltages of the racks, an sorting step of sorting the racks in ascending powers based on the voltage values of the racks, a comparison step of comparing a difference between a maximum voltage value and a minimum voltage value with a set voltage, a charging/discharging count step of comparing the voltage values of the racks with a reference voltage to increase a charging or discharging count, and a charging/discharging step of charging or discharging the racks according to the charging or discharging count, wherein, in a case in which, at the comparison step, the difference between the maximum voltage value and the minimum voltage value is lower than the set voltage, the racks are charged with the maximum voltage value without the charging/discharging count step and the charging/discharging step, and, in a case in which, at the comparison step, the difference between the maximum voltage value and the minimum voltage value is higher than the set voltage, the charging/discharging count step and the charging/discharging step are carried out.

BACKGROUND ART

In recent years, a secondary battery, which can be charged and discharged, has been widely used as an energy source for wireless mobile devices or an auxiliary power apparatus. In addition, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

The secondary battery is used in various kinds of mobile devices that require high output. To this end, a battery pack including a plurality of battery cells connected in series to each other may be used in electric vehicles or hybrid electric vehicles as a power source.

In a middle or large-sized secondary battery module including a plurality of battery cells (unit cells), all or at least some of battery cells constituting the battery module are connected in series to each other in order to provide high output, and the battery cells have the same capacity and voltage standards.

In addition, a plurality of battery packs, each of which includes a plurality of battery cells, is mounted in electric vehicles based on the specifications of the electric vehicles. Furthermore, a charging apparatus and a battery management system are provided to maintain the voltage of the battery cells of the battery packs at an appropriate level while charging or discharging the battery cells.

Although the battery cells have the same capacity and voltage standards, however, the battery cells generally have different voltages due to various factors during the manufacture of the battery cells. If battery cells constituting a battery module have different voltages, the performance of the battery module is lowered.

In addition, the charging apparatus and the battery management system are designed to supply electric current to the battery cells in a lump such that the battery cells are charged with the supplied electric current irrespective of the difference in characteristics between the battery cells. Since the battery cells are charged in a lump irrespective of the difference in capacity between the battery cells or the difference in internal resistance between the battery cells in such a lump charging method, some of the battery cells may be overcharged, or some of the battery cells may not be fully charged.

Furthermore, in a case in which a battery pack including a plurality of battery cells connected in series to each other is used for a long time, characteristic factors of the battery cells may differ from each other as a charging and discharging cycle is increased. As a result, the voltages of the battery cells may be unbalanced. In a case in which the deviation in voltage between the battery cells is excessively increased, the battery cells may be under dangerous situations. For example, the battery cells may explode.

Therefore, there is a high necessity for providing a battery pack balancing method that is capable of stably initializing and controlling battery cells constituting the battery pack in order to fundamentally solving the above problems.

DISCLOSURE

Technical Problem

The present invention has been made to solve the above problems and other technical problems that have yet to be resolved.

It is an object of the present invention to provide a method of balancing rack voltages of a battery pack configured to have a structure in which a plurality of racks is connected in series or in parallel to each other, the method including measuring voltages of the racks to determine which racks are to be charged or discharged and automatically carrying out rack voltage balancing based on the determination results, in order to conveniently and safely solve unbalance in charging between battery cells without additional equipment, manpower, and time required to carry out general rack voltage balancing, thereby improving the performance, capacity, and lifespan of the battery pack.

Technical Solution

In accordance with one aspect of the present invention, the above and other objects can be accomplished by the provision of a method of balancing rack voltages of a battery pack configured to have a structure in which a plurality of racks is connected in series or in parallel to each other, and a plurality of unit modules is connected in series to each other in each of the racks, the rack voltage balancing method including (a) a voltage measurement step of measuring voltages of the racks, (b) an sorting step of sorting the racks in ascending powers based on the voltage values of the racks, (c) a comparison step of comparing a difference between a maximum voltage value and a minimum voltage value with a set voltage, (d) a charging/discharging count step of comparing the voltage values of the racks with a reference voltage to increase a charging or discharging count, and (e) a charging/discharging step of charging or discharging the racks according to the charging or discharging count, wherein, in a case in which, at step (c), the difference between the maximum voltage value and the minimum voltage value is lower than the set voltage, the racks are charged with the maximum voltage value without steps (d) and (e), and, in a case in which, at step (c), the difference between the maximum voltage value and the minimum voltage value is higher than the set voltage, steps (d) and (e) are carried out.

Therefore, in a method of balancing rack voltages of a battery pack configured to have a structure in which a plurality of racks is connected in series or in parallel to each other according to the present invention, voltages of the racks may be measured to determine which racks are to be charged or discharged, and rack voltage balancing may be automatically carried out based on the determination results. Consequently, it is possible to conveniently and safely solve unbalance in charging between battery cells without additional equipment, manpower, and time required to carry out general rack voltage balancing, thereby improving the performance, capacity, and lifespan of the battery pack.

In a concrete example, at step (b), the racks may be sorted based on the voltage values of the racks using any one selected from among various sorting algorithms, such as selective sorting and quick sorting. Specifically, step (b) may include sorting the racks from a rack having the minimum voltage value (i=0) to a rack having the maximum voltage value (i=the total number of racks−1) based on the voltage values of the racks.

Meanwhile, in a case in which a battery pack including a plurality of battery cells connected in series to each other is used for a long time, as described above, characteristic factors of the battery cells may differ from each other as a charging and discharging cycle is increased. As a result, the voltages of the battery cells may be unbalanced. For this reason, some of the battery cells may be overcharged, or some of the battery cells may not be fully charged. In a case in which the deviation in voltage between the battery cells is large, for example 20V or higher, the battery cells may be under dangerous situations. For example, the battery cells may explode.

In order to determine the deviation in voltage between the battery cells at which the performance of the battery cells is lowered and the battery cells explode as described above, it is necessary to set a desired voltage at step (c). The desired voltage value may be variously set based on the type and capacity of the battery cells. For example, the set voltage may have a range of 10 to 30% state of charge (SOC). Specifically, the set voltage may have a range of 20% SOC.

In addition, at step (d), the average voltage of the racks may be set as the reference voltage. Specifically, the reference voltage may be expressed as a voltage range value/2+ the minimum voltage value, and the voltage range value may be expressed as the maximum voltage value−the minimum voltage value.

In a concrete example, in a case in which, at step (d), the voltage values of the racks are lower than the reference voltage, a process of increasing a discharging count may be carried out. On the other hand, in a case in which, at step (d), the voltage values of the racks are higher than the reference voltage, a process of increasing a charging count may be carried out.

At the charging or discharging count step, a process of sequentially increasing a charging or discharging count from i=0 to i=the total number of racks−1 based on i values sorted according to the voltage values may be carried out. After the charging or discharging count is increased from a rack having the minimum voltage value to a rack having the maximum voltage value, it may be determined whether the racks are to be charged or discharged based on the increased charging or discharging count, as at step (e).

Specifically, step (e) may include, in a case in which the discharging count is higher than the charging count and the minimum voltage value is higher than the reference voltage, sequentially discharging the racks from a rack having the maximum voltage value to a rack having the minimum voltage value to balance the voltages of the racks. Alternatively, step (e) may include, in a case in which the discharging count is higher than the charging count and the minimum voltage value is lower than the reference voltage, sequentially charging the racks from a rack having the minimum voltage value to a rack having the maximum voltage value.

In addition, step (e) may include, in a case in which the charging count is higher than the discharging count, sequentially charging the racks from a rack having the minimum voltage value to a rack having the maximum voltage value. Alternatively, step (e) may include, in a case in which the charging count and the discharging count are equal to each other, sequentially discharging the racks from a rack having the maximum voltage value to a rack having the minimum voltage value in order to minimize the amount of energy received from a grid. The charging/discharging step may be carried out to reduce the deviation in voltage between the racks, whereby it is possible to stably initialize the battery pack.

In another concrete example, when the same voltage as a rack having a higher voltage than a rack that is being currently charged is reached during charging process of the racks at step (e), i.e. the charging or discharging step, a process of connecting the racks in parallel to each other to simultaneously charge the racks may be carried out. Specifically, when the voltage of a rack having the minimum voltage value, which is charged first, reaches the voltage of a rack having the second lowest voltage value, the rack having the minimum voltage value and the rack having the second lowest voltage value may be connected in parallel to each other, and may then be charged simultaneously. In the same manner, charging may be sequentially carried out for the racks from a rack having the third lowest voltage value to a rack having the maximum voltage value.

On the other hand, when the same voltage as a rack having a lower voltage than a rack that is being currently discharged is reached during the discharging process in a case in which the racks are discharged at step (e), a process of connecting the racks in parallel to each other to simultaneously discharge the racks may be carried out. Specifically, when the voltage of a rack having the maximum voltage value, which is discharged first, reaches the voltage of a rack having the second highest voltage value, the rack having the maximum voltage value and the rack having the second highest voltage value may be connected in parallel to each other, and may then be discharged simultaneously. In the same manner, discharging may be sequentially carried out for the racks from a rack having the third highest voltage value to a rack having the minimum voltage value.

In accordance with another aspect of the present invention, there is provided a battery pack, voltages of which are balanced using the rack voltage balancing method as described above.

In accordance with a further aspect of the present invention, there is provided a device including the battery pack as a power source. For example, the device may be used as a power tool, an electric automobile selected from a group consisting of an electric vehicle (EV), a hybrid electric vehicle (HEV), and a plug-in hybrid electric vehicle (PHEV), an electric bicycle (E-bike), an electric scooter (E-scooter), an electric golf cart, or a power storage apparatus. However, the present invention is not limited thereto.

BRIEF DESCRIPTION OF DRAWINGS

The above and other objects, features and other advantages of the present invention will be more clearly understood from the following detailed description taken in conjunction with the accompanying drawings, in which.

BEST MODE

Figure 1:
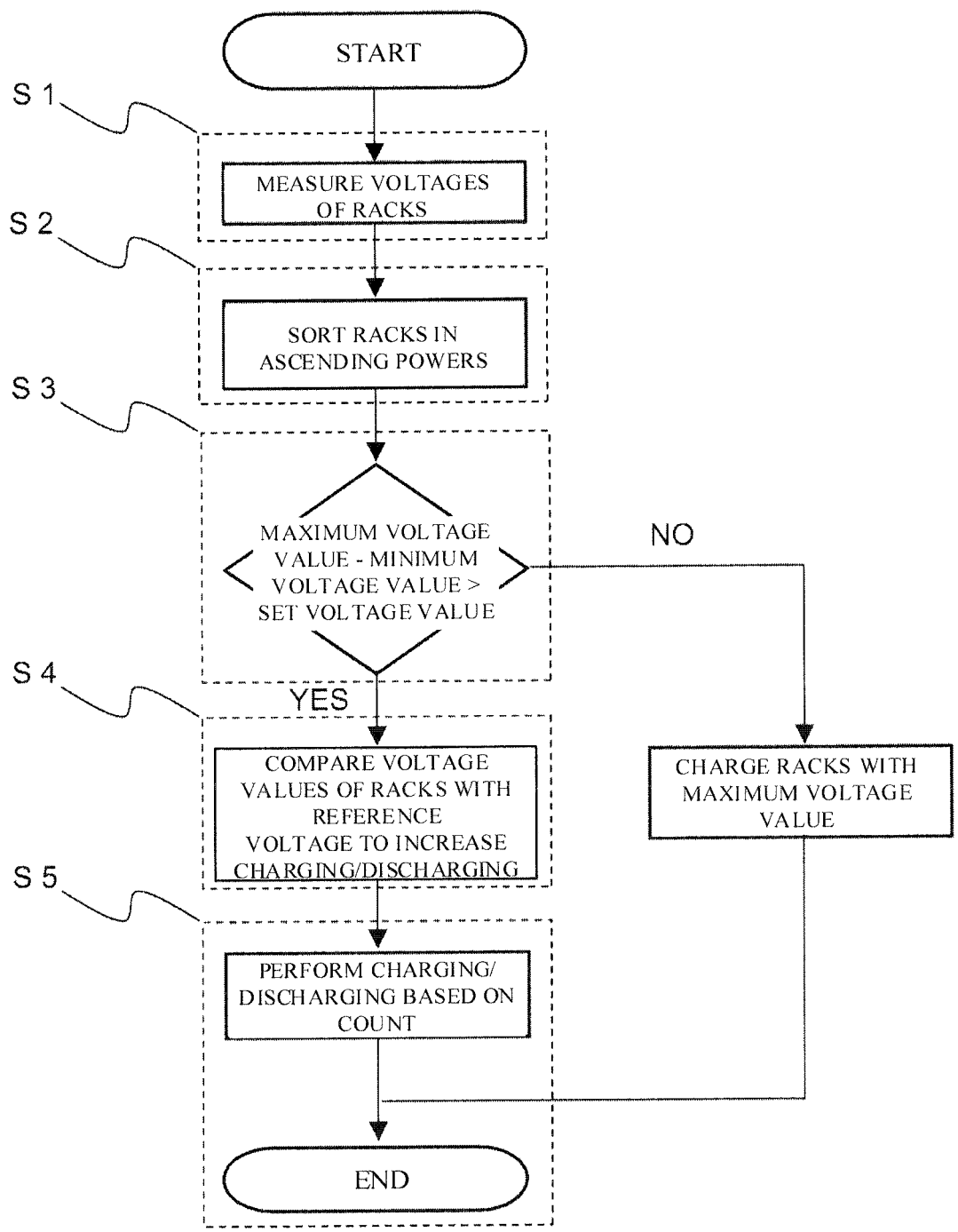
FIG. 1 is a flowchart showing a rack voltage balancing method according to an embodiment of the present invention.

Now, exemplary embodiments of the present invention will be described in detail with reference to the accompanying drawings. It should be noted, however, that the scope of the present invention is not limited by the illustrated embodiments. FIG. 1 is a flowchart typically showing a rack voltage balancing method according to an embodiment of the present invention.

Referring to FIG. 1, in the rack voltage balancing method according to the present invention, a voltage measurement step (S1) of measuring the voltages of racks is carried out, and then an sorting step (S2) of sorting the racks in ascending powers based on the voltage values of the racks measured at the voltage measurement step (S1) is carried out. That is, an sorting step of sorting the racks in ascending powers from a rack having the minimum voltage value (i=0) to a rack having the maximum voltage value (i=the total number of racks−1) is carried out.

Subsequently, a comparison step (S3) of comparing a difference between the maximum voltage value and the minimum voltage value based on the measured voltages of the respective racks with a predetermined set voltage value is carried out. Specifically, a step of comparing a difference between the maximum voltage value and the minimum voltage value with a voltage value having a range of 20% state of charge (SOC) to determine whether voltage balancing is to be carried out is carried out. In a case in which the difference between the maximum voltage value and the minimum voltage value is lower than the set voltage value, it is determined that deviation in voltage between the racks does not affect the battery cells, and a step of charging the racks with the maximum voltage value is carried out.

On the other hand, in a case in which the difference between the maximum voltage value and the minimum voltage value is higher than the set voltage value, it is determined that deviation in voltage between the racks affects the battery cells, and the following steps are carried out to balance the rack voltages.

Subsequently, a charging/discharging count step (S4) of comparing the voltage values of the respective racks with a reference voltage to increase a charging or discharging count for the respective racks is carried out, and a charging/discharging step (S5) of determining whether charging is to be carried out or discharging is to be carried out based on the count increased at the charging/discharging count step (S4) and charging or discharging the respective racks accordingly is carried out, in order to balance the rack voltages.

Hereinafter, the charging/discharging count step (S4) and the charging/discharging step (S5) will be described in more detail.

Figure 2:
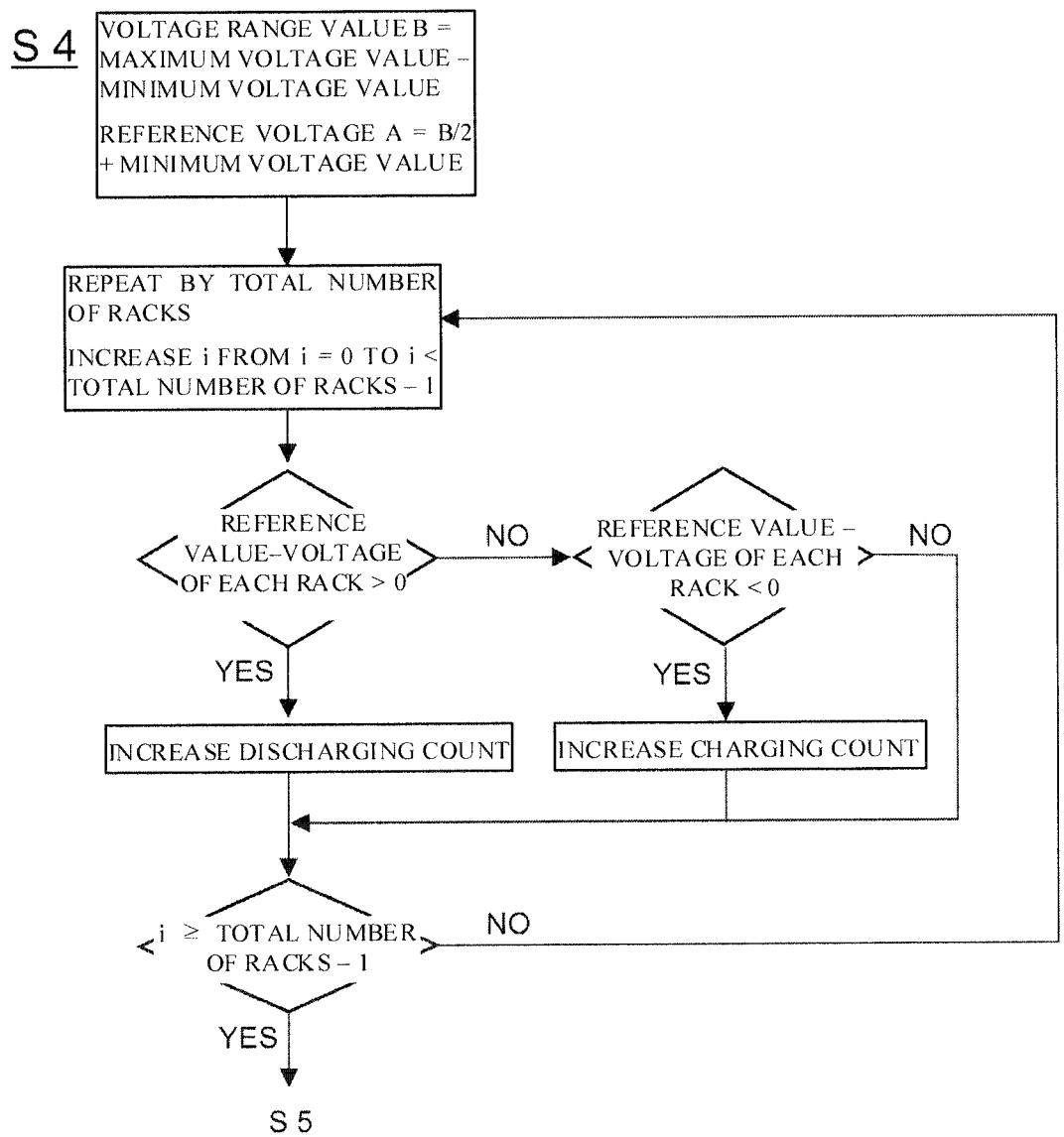
FIG. 2 is a flowchart showing a rack voltage balancing method according to step S4 of FIG. 1.

FIG. 2 is a flowchart typically showing a rack voltage balancing method according to step S4 of FIG. 1.

Referring to FIG. 2 together with FIG. 1, a reference voltage is set based on the voltage values measured at step S1. Specifically, a reference voltage A is expressed as a voltage range value B/2+the minimum voltage value, and the voltage range value B is expressed as the maximum voltage value−the minimum voltage value.

A process of comparing the voltage values of the respective racks with the reference voltage obtained at step S1 to increase a charging or discharging count for the respective racks is carried out. The reference voltage is typically the average of the rack with the highest voltage and the rack with the lowest voltage. If the rack has a voltage lower than the reference voltage, the discharging count is increased by 1. If the rack has a voltage higher than the reference voltage, the charging count is increased by 1. After all racks have been considered, if more racks have a voltage less than the reference voltage, the discharging count will be higher than the charging count and a discharge process will be performed. Conversely, if more racks have voltage greater than the reference voltage, the charging count will be greater than the discharging count and a charging process will be performed. Specifically, the voltage values of the racks sorted from the rack having the minimum voltage value (i=0) to the rack having the maximum voltage value (i=the total number of racks−1) are sequentially compared with the reference voltage from the rack (i=0) to the rack (i=the total number of racks−1). In a case in which the reference voltage−the voltage value of an i-th rack is higher than 0, a discharging count is increased. On the other hand, in a case in which the reference voltage−the voltage value of the i-th rack is lower than 0, a charging count is increased. The charging or discharging count is repeatedly measured for the total number of racks. Subsequently, step S5 is carried out.

Figure 3:
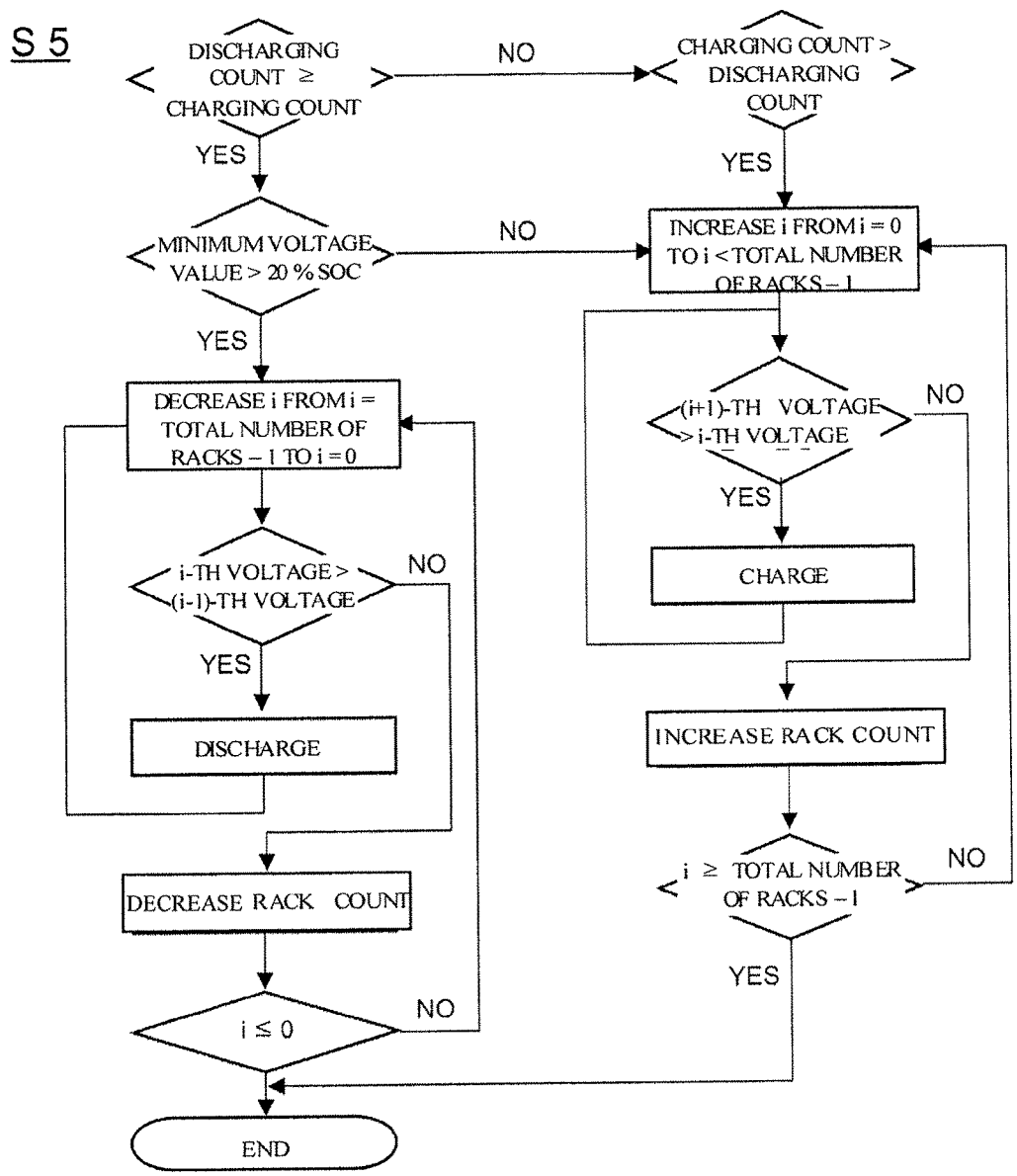
FIG. 3 is a flowchart showing a rack voltage balancing method according to step S5 of FIG. 1.

FIG. 3 is a flowchart typically showing a rack voltage balancing method according to step S5 of FIG. 1.

Referring to FIG. 3 together with FIGS. 1 and 2, in a case in which, at step S4, the discharging count is equal to or higher than the charging count, a step of determining whether the minimum voltage value is higher than the predetermined set voltage having a range of 20% SOC is carried out. In case in which the minimum voltage value is higher than the set voltage, a discharging step of performing discharging is carried out. On the other hand, in case in which the minimum voltage value is lower than the set voltage, a charging step of performing charging is carried out. In addition, in a case in which, at step S4, the charging count is higher than the discharging count, a charging step of performing charging is carried out.

First, at the discharging step, the racks are sequentially repeatedly discharged from the rack having the maximum voltage value (i=the total number of racks−1) to the rack having the minimum voltage value (i=0). Discharging is carried out until the voltage of an i-th rack for which discharging is being currently carried out reaches the voltage of an (i−1)-th rack having a next lower voltage value than the i-th rack. In a case in which the voltage of the i-th rack reaches the voltage of the (i−1)-th rack, the number of racks that are simultaneously discharged is confirmed trough a process of further increasing a rack count, the confirmed racks are connected in parallel to each other, and then the above-mentioned process is repeatedly carried out. When the voltages of the respective racks finally reach the minimum rack voltage value, rack voltage balancing is completed.

On the other hand, at the charging step, the racks are sequentially repeatedly charged from the rack having the minimum voltage value (i=0) to the rack having the maximum voltage value (i=the total number of racks−1). Charging is carried out until the voltage of an i-th rack for which charging is being currently carried out reaches the voltage of an (i+1)-th rack having a next higher voltage value than the i-th rack. In a case in which the voltage of the i-th rack reaches the voltage of the (i+1)-th rack, the number of racks that are simultaneously charged is confirmed trough a process of further increasing a rack count, the confirmed racks are connected in parallel to each other, and then the above-mentioned process is repeatedly carried out. When the voltages of the respective racks finally reach the maximum rack voltage value, rack voltage balancing is completed.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, in a method of balancing rack voltages of a battery pack configured to have a structure in which a plurality of racks is connected in series or in parallel to each other according to the present invention, voltages of the racks are measured to determine which racks are to be charged or discharged, and rack voltage balancing is automatically carried out based on the determination results. Consequently, it is possible to conveniently and safely solve unbalance in charging between battery cells without additional equipment, manpower, and time required to carry out general rack voltage balancing, thereby improving the performance, capacity, and lifespan of the battery pack.

The invention claimed is:

1. A method of balancing rack voltages of a battery pack configured to have a structure in which a plurality of racks is connected in series or in parallel to each other, and a plurality of unit modules is connected in series to each other in each of the racks, the rack voltage balancing method comprising:
   (a) a voltage measurement step of measuring voltages of the racks;
   (b) an sorting step of sorting the racks in ascending powers based on the voltage values of the racks;
   (c) a comparison step of comparing a difference between a maximum voltage value and a minimum voltage value with a set voltage;
   (d) a charging count step of comparing the voltage values of the racks with a reference voltage to increase a charging count when the voltage values is less than the reference voltage and a discharging count step of comparing the voltage values of the racks with the reference voltage to increase a discharging count when the voltage values is greater than the reference voltage; and
   (e) a charging step of charging the racks if the charging count is greater than the discharging count and a discharging step of discharging the racks if the discharging count is greater than or equal to the charging count, wherein in a case in which, at step (c), the difference between the maximum voltage value and the minimum voltage value is lower than the set voltage, the racks are charged with the maximum voltage value without steps (d) and (e), and
   in a case in which, at step (c), the difference between the maximum voltage value and the minimum voltage value is higher than the set voltage, steps (d) and (e) are carried out.

2. The rack voltage balancing method according to claim 1, wherein step (b) comprises sorting the racks from a rack having the minimum voltage value (i=0) to a rack having the maximum voltage value (i=the total number of racks−1) based on the voltage values of the racks.

3. The rack voltage balancing method according to claim 1, wherein the set voltage of step (c) has a range of 20% state of charge (SOC).

4. The rack voltage balancing method according to claim 1, wherein the reference voltage of step (d) is expressed as A (a voltage range value/2+the minimum voltage value), and the voltage range value is expressed as B (the maximum voltage value−the minimum voltage value).

5. The rack voltage balancing method according to claim 1, wherein step (d) comprises, in a case in which the voltage values of the racks are lower than the reference voltage, increasing a discharging count.

6. The rack voltage balancing method according to claim 1, wherein step (d) comprises, in a case in which the voltage values of the racks are higher than the reference voltage, increasing a charging count.

7. The rack voltage balancing method according to claim 1, wherein step (d) comprises sequentially increasing a charging or discharging count from i=0 to i=the total number of racks−1.

8. The rack voltage balancing method according to claim 1, wherein step (e) comprises, in a case in which the discharging count is higher than the charging count and the minimum voltage value is higher than the reference voltage, sequentially discharging the racks from a rack having the maximum voltage value to a rack having the minimum voltage value.

9. The rack voltage balancing method according to claim 8, further comprising, when the same voltage as a rack having a lower voltage than a rack that is being currently discharged is reached during the discharging process, connecting the racks in parallel to each other to simultaneously discharge the racks.

10. The rack voltage balancing method according to claim 1, wherein step (e) comprises, in a case in which the discharging count is higher than the charging count and the minimum voltage value is lower than the reference voltage, sequentially charging the racks from a rack having the minimum voltage value to a rack having the maximum voltage value.

11. The rack voltage balancing method according to claim 10, further comprising, when the same voltage as a rack having a higher voltage than a rack that is being currently charged is reached during the charging process, connecting the racks in parallel to each other to simultaneously charge the racks.

12. The rack voltage balancing method according to claim 1, wherein step (e) comprises, in a case in which the charging count is higher than the discharging count, sequentially charging the racks from a rack having the minimum voltage value to a rack having the maximum voltage value.

13. The rack voltage balancing method according to claim 12, further comprising, when the same voltage as a rack having a higher voltage than a rack that is being currently charged is reached during the charging process, connecting the racks in parallel to each other to simultaneously charge the racks.

14. The rack voltage balancing method according to claim 1, wherein step (e) comprises, in a case in which the charging count and the discharging count are equal to each other, sequentially discharging the racks from a rack having the maximum voltage value to a rack having the minimum voltage value.

15. The rack voltage balancing method according to claim 14, further comprising, when the same voltage as a rack having a lower voltage than a rack that is being currently discharged is reached during the discharging process, connecting the racks in parallel to each other to simultaneously discharge the racks.

16. A battery pack, voltages of which are balanced using a rack voltage balancing method according to claim 1.

17. A device comprising a battery pack according to claim 16.

18. The device according to claim 17, wherein the device is selected from a group consisting of a power tool, an electric automobile selected from a group consisting of an electric vehicle (EV), a hybrid electric vehicle (HEV), and a plug-in hybrid electric vehicle (PHEV), an electric bicycle (E-bike), an electric scooter (E-scooter), an electric golf cart, and a power storage apparatus.

19. A method of balancing rack voltages of a battery pack having a plurality of racks connected in series or in parallel to each other, and a plurality of unit modules connected in series to each other in each of the racks, the rack voltage balancing method comprising:
   measuring a voltage of each of the racks;
   comparing a difference between a maximum voltage value and a minimum voltage value with a set voltage;
   comparing the voltage values of each of the racks with a reference voltage; and
   charging or discharging the racks according to the comparison,
   wherein, when a number of racks having a voltage lower than the reference voltage is greater than a number of racks having a voltage higher than the reference voltage, the racks are discharged and when the number of racks having a voltage higher than the reference voltage is greater than a number of racks having a voltage lower than the reference voltage, the racks are charged.

20. The method of claim 19, wherein the reference voltage is an average of the maximum voltage value and the minimum voltage.

* * * * *